US012026062B2

(12) United States Patent
Yadav et al.

(10) Patent No.: US 12,026,062 B2
(45) Date of Patent: Jul. 2, 2024

(54) PROVIDER-AGNOSTIC MANAGEMENT OF BACKUP DATA STORED ON A CLOUD-BASED OBJECT STORAGE

(71) Applicant: EMC IP Holding Company LLC, Hopkinton, MA (US)

(72) Inventors: Sunil Yadav, Bangalore (IN); Shelesh Chopra, Bangalore (IN); Amarendra Behera, Bangalore (IN); Tushar Dethe, Bangalore (IN); Himanshu Arora, Bangalore (IN); Deependra Singh, Kanpur (IN); Jigar Bhanushali, Valsad (IN); Prabhat Kumar Dubey, Chikkanagamangala (IN); Ravi Vijayakumar Chitloor, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 440 days.

(21) Appl. No.: 17/140,855

(22) Filed: Jan. 4, 2021

(65) Prior Publication Data

US 2022/0214946 A1 Jul. 7, 2022

(51) Int. Cl.
| G06F 11/14 | (2006.01) |
| G06F 9/54 | (2006.01) |
| G06F 16/23 | (2019.01) |
| G06F 21/62 | (2013.01) |

(52) U.S. Cl.
CPC .......... *G06F 11/1464* (2013.01); *G06F 9/547* (2013.01); *G06F 16/2379* (2019.01); *G06F 21/6218* (2013.01); *G06F 2201/84* (2013.01)

(58) Field of Classification Search
CPC ............. G06F 11/1464; G06F 16/2379; G06F 21/6218; G06F 2201/84; G06F 9/547
See application file for complete search history.

(56) References Cited

U.S. PATENT DOCUMENTS

| 8,849,764 | B1 * | 9/2014 | Long | G06F 11/1469 |
| | | | | 707/646 |
| 9,992,282 | B1 * | 6/2018 | Degwekar | H04L 69/40 |
| 10,341,435 | B2 * | 7/2019 | Brunk | G06F 3/0685 |
| 10,929,378 | B1 * | 2/2021 | Bigman | G06F 16/2455 |
| 11,526,405 | B1 * | 12/2022 | Fisher | G06F 11/1464 |

(Continued)

*Primary Examiner* — Gary S Gracia
(74) *Attorney, Agent, or Firm* — Dergosits & Noah LLP; Todd A. Noah (57) ABSTRACT

Described is a system for managing backup data stored on a cloud-based object storage irrespective of the storage provider. The system may include a server (or gateway) that provides a backup service, and acts as an intermediary between a client device and object storage. To provide such capabilities, the system may manage an application programming interface (API) that provides a uniform set of methods to a client device irrespective of the destination object storage provider. A function library may include provider-specific functions that invoke corresponding storage-layer operations provided by the destination object storage. The server may also manage an operation pool to schedule operations and saturate bandwidth to the object storage. The server may also implement a specialized metadata database to provide further storage efficiencies by storing certain backup data exclusively within the metadata database.

20 Claims, 5 Drawing Sheets (56) References Cited

U.S. PATENT DOCUMENTS

| | | | | |
|---|---|---|---|---|
| 11,645,592 | B2* | 5/2023 | Martynov | G06F 16/24578 |
| | | | | 705/7.22 |
| 11,747,998 | B1* | 9/2023 | Indupuru | G06F 3/0655 |
| | | | | 711/164 |
| 2010/0333116 | A1* | 12/2010 | Prahlad | G06F 3/067 |
| | | | | 713/153 |
| 2012/0117320 | A1* | 5/2012 | Pinchover | G06F 12/0866 |
| | | | | 711/170 |
| 2013/0159700 | A1* | 6/2013 | Nakagawa | G06F 21/78 |
| | | | | 713/155 |
| 2013/0339419 | A1* | 12/2013 | Emaru | G06F 9/4856 |
| | | | | 709/201 |
| 2017/0344575 | A1* | 11/2017 | Naylor | G06F 12/0813 |
| 2020/0082111 | A1* | 3/2020 | Leemet | G06F 16/116 |
| 2020/0294124 | A1* | 9/2020 | Jia | H04L 9/0891 |
| 2021/0073177 | A1* | 3/2021 | Chen | H04L 9/3239 |
| 2021/0089496 | A1* | 3/2021 | Kamble | G06F 16/25 |
| 2021/0185035 | A1* | 6/2021 | Fernandez Yu | G06F 16/436 |
| 2021/0271650 | A1* | 9/2021 | Wang | G06F 16/174 |
| 2022/0129352 | A1* | 4/2022 | Yadav | H04L 67/5651 |
| 2022/0214946 | A1* | 7/2022 | Yadav | G06F 3/0607 |
| 2023/0401329 | A1* | 12/2023 | Muralidhar | G06F 21/6218 |

\* cited by examiner

PROVIDER-AGNOSTIC MANAGEMENT OF BACKUP DATA STORED ON A CLOUD-BASED OBJECT STORAGE

TECHNICAL FIELD

This disclosure relates to data backup systems, and more particularly, managing backup data stored on a third-party object storage system.

BACKGROUND

Cloud-based storage systems (or on-demand storage systems) may provide various tools that are crucial for enterprise level network clients. For example, clients may rely on such systems for data protection and recovery services that efficiently back up and recover data in the event of data loss to allow business applications to remain in service or quickly come back up to service. As part of the data protection and recovery infrastructure, clients may rely on third-party cloud-based storages to leverage the benefits associated with such systems (or services) such as cost efficiency (e.g. pay-per-use model) and scalability. These cloud-based storages may implement an object-based storage architecture, and accordingly, client data such as backup data may be stored as objects (or data objects). When managing data, clients may store data within both a local (or on-premises) environment as well as the cloud-based object storage. Clients are often required to maintain strict security protocols to secure locally stored data, and as a result, are often burdened with developing elaborate configurations to safe guard the local data that may be exposed to the third-party object storage. Moreover, these cloud-based object storages may be provided by different companies (or entities, providers, etc.) that each implement different storage infrastructures. Accordingly, integrating such systems with the client's backup infrastructure becomes increasingly difficult. Thus, there is a continued need to integrate backup services with cloud-based object storages.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

Described is a system (and method) for managing backup data stored on a cloud-based object storage irrespective of the storage provider. In other words, the system may provide a mechanism to manage backup data in a provider-agnostic manner. In some embodiments, the system may be implemented as part of a server (or gateway) that provides a backup service to a client device. The server may also act as an intermediary between a client device and the cloud-based object storage. Accordingly, the system may allow different backup service clients to seamlessly interact with different object storage providers (e.g. Amazon S3, Microsoft Azure, etc.) via the same server (or set of components). To provide such capabilities, the system may implement specialized components to interact with object storage providers in a universal and resource efficient manner. To provide access to data operations on the object storage, the system may first coordinate the verification, by the object storage, of credentials associated with the client device requesting access to the object storage. The system may then leverage the specialized components in response to a request by the client device to perform data operations on the object storage. For example, the server may provide access to data management operations via an application programming interface (API) that provides a uniform set of methods to client devices irrespective of the destination object storage provider. To provide such provider-agnostic (or object-storage-agnostic) functionality, the server may include a function library that includes object-storage-specific (or provider-specific) functions. These functions may invoke a corresponding set of storage-layer operations via a storage API provided by the object storage provider. In addition, the server may manage an operation pool to schedule operations and utilize (e.g. saturate) connection bandwidth to the object storage. For example, particular data operations to be performed on the object storage may sub-divided and added to operation-specific queues. The server may also implement a specialized metadata database. For example, the metadata database may be an embedded database maintained by the server. The server may leverage the metadata database to provide further storage efficiencies by storing certain backup data exclusively within the metadata database, which results in a conservation of storage resources. Moreover, the server may rely on the metadata database to enable a reconstruction of client data only at the time of recovery. Accordingly, the system may provide a universal mechanism to efficiently manage backup data stored on object storages of various providers.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and backup services. For example, at least some functionality may be provided by, or implemented in connection with, various platforms such as the Data Domain™ data protection platform provided by Dell EMC Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components (or devices) such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique, infrastructure, or hardware (e.g. Solid State Drive (SSD), Hard Disk Drive (HDD)), which may include storage systems provided by a cloud service provider.

Figure 1:
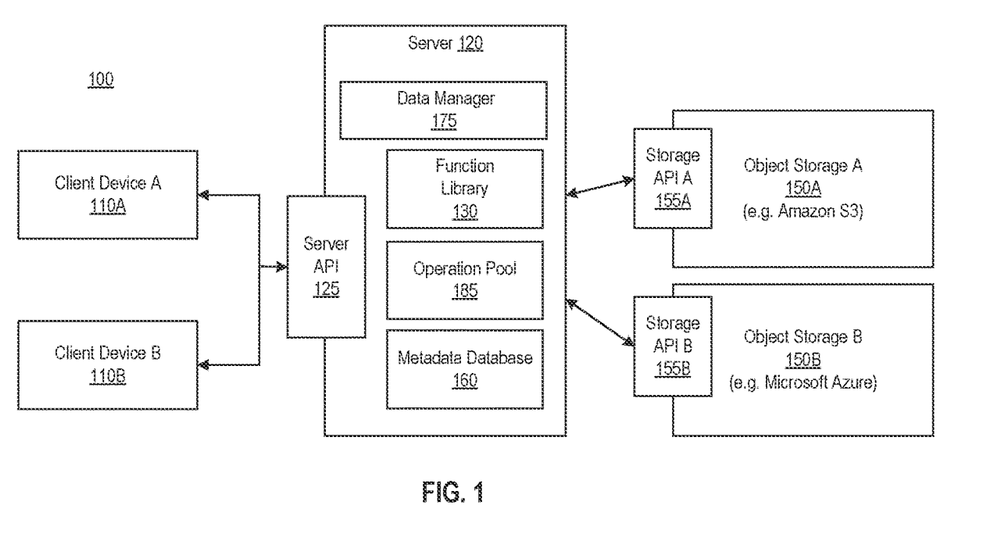
FIG. 1 is a block diagram illustrating an example of an operating environment that may be used in conjunction with one or more embodiments of the disclosure.

More specifically, and with reference to FIG. 1, shown is a block diagram illustrating an example of an operating environment 100 for managing backup data on an object storage according to one or more embodiments of the disclosure. It should be noted that the components of operating environment 100 may interact via a network, which may be any type of wired or wireless network including a local area network (LAN), a wide area network (WAN), or a direct communication link, or other suitable connection.

As shown, the environment 100 may include one or more client devices 110 (e.g. client devices 110A and 110B), a server (e.g. a cloud-based component/gateway and/or a proxy server) 120, and one or more cloud-based object storages 150 (e.g. object storages 150A and 150B). In general, the server 120 may act as an intermediary between the client device 110 and the object storage 150. In some embodiments, the client device 110 may be associated with a client that is a customer (or subscriber, client, tenant, user, account, etc.) of a backup service or platform (e.g. software/platform-as-a-service) provided by a first entity, as well as a customer of an object storage or service (e.g. software/platform-as-a-service) provided by a different (or second) entity. For example, the server 120 may be provided as part of the backup service provided by the first entity (e.g. Dell EMC), and the object storage 150 may be provided as part of a cloud-based object storage service provided by the different entity (e.g. Amazon S3, Microsoft Azure, IBM Cloud Object Storage, Google Cloud Storage, etc.). In some embodiments, the first entity providing the backup service may also provide (or host) the client device 110 (e.g. as part of a VM).

The client device (or client system) 110 may be associated with client data (or data) that is backed up to the object storage 150. The object storage (or object storage system) 150 may include a persistent object storage that implements a storage architecture that manages data as objects. For example, each object stored by the object storage 150 may include data, meta-data, and/or a globally unique identifier for the object.

The server 120 may provide enhanced security by being a single secure point of access to data stored externally on the object storage 150. For example, a client device 110 may implement a certain network configuration (e.g. firewall) that limits external access to the client environment. Such a network configuration may be customized to authorize external access to the client device 110 only by the server 120 and not the object storage 150 directly. In addition, the server 120 may also allow the client device 110 to offload resource intensive data management processing. For example, the server 120 may handle backup-related data processing before storing data into the object storage 150. Accordingly, the server 120 may provide advantages over traditional proxy servers that merely forward data to the object storage 150. In addition, the server 120 may be an application or hardware component remote from the client device 110 (e.g. as part of a cloud-based service). Accordingly, the server 120 may be scalable such that it may perform data operations in parallel for multiple client devices 110 and for multiple object storages 150.

As described, the server 120 may act as an intermediary for communications between the client device 110 and the object storage 150. For example, these communications may include requests by the client device 110 to perform data operations on the object storage 150, which are routed through the server 120. For example, the client device 110 may provide (or send, transmit, etc.) client data (or data) to the server 120 using a server API 125. The server 120 may then initiate (or perform, execute, etc.) a corresponding storage operation directly on the object storage using a storage API 155 (e.g. storage API 155A/B). In some embodiments, the server API 125 may be a REST API that includes a common set of operations that correspond to various data-related operations on the object storage 150. For example, the server API 125 may allow the client device 110 to read data from an object storage 150, write data to an object storage 150, copy data within the object storage 150, and various other data management operations. The same set of operations provided by the server API 125 may be used by the client device 110 irrespective of whether the operations are for data stored on object storage A 150A, or object storage B 150B. To provide such object-storage-agnostic functionality, the server 120 may include a function library 130 that includes object-storage-specific (or provider-specific) functions. In other words, the function library 130 may include a specific set of functions that are configured to interact with a particular object storage 150A/B. The server 120 may initiate data operations directly on the object storage 150 by calling various methods (functions, operations, etc.) of the storage API 155. For example, to interact with object storage A 150A (e.g. Amazon S3), the server 120 may use (e.g. execute, invoke, call, etc.) a first set of functions specific to object storage A 150A/API 155A, and to interact with object storage B 150B (e.g. Microsoft Azure), the server 120 may use a second set of functions specific to object storage B 150B/API 155B. In some embodiments, the storage API 155 may include only a standard set of storage operations. Accordingly, the server 120 may be responsible for implementing efficient storage and recovery procedures as described herein.

As described, the server 120 may manage backed up client data stored on the object storage 150. Accordingly, the server 120 may include a data manager (or library manager) 175. The data manager (or manager) 175 may coordinate (or manage, orchestrate, execute, automate, etc.) the initiation (or execution) of data operations on the object storage 150. In addition, the data manager 175 may initialize and manage components such as the operation pool 185, metadata database 160, and other components (e.g. server API) used to manage data. In some embodiments, the data manager 175 may provide a user interface that allows a user to perform and configure various settings associated with managing backup data. For example, the user interface may allow a user to configure (e.g. input) various settings such as a number of concurrent access requests (or access threads) to an object storage 150. In addition, the data manager 175 may direct (or control, initiate, etc.) other components of the operating environment 100 to perform various processes as further described herein.

To further improve potential storage and recovery efficiency, the server 120 may leverage a specialized metadata database 160. The metadata database 160 may be maintained by the server 120. The metadata database 160 may include an embedded database. For example, the metadata database 160 may be created by the server 120 using a particular software library (e.g. SQLite library). The metadata database 160 may reside on the object storage 150, the server 120, and/or another component (e.g. cloud-based component) that is accessible by the server 120. For example, the server 120 may update the metadata database 160 when residing on the object storage 150 by accessing the storage API 155. The metadata database 160 may store metadata (e.g. information) associated with client data stored on the client device 110 and/or backed up to the object storage 150. The metadata may include information that is stored as part of the client data. For example, the client data may include data files (or files) that store metadata as part of the file. Accordingly, a copy of such metadata may also be stored as part of the metadata database 160. In some embodiments, the metadata of the metadata database 160 may include any information (e.g. properties) that may be associated with data or a file. For example, the metadata may include information related to a time (e.g. last accessed time, last modified time, creation time, etc.) associated with the data, author, importance, read only, storage location, etc. In some embodiments, the client data may include emails, and the metadata associated with emails may include a value indicating whether the email is read/unread, whether the email is flagged by a user, marked as important or urgent, a priority level, whether the email includes an attachment, last sent date, a due date associated with the email, etc. The metadata database 160 may also store various types of backup information associated with the backed up client data. For example, the backup information may include a point-in-time the client data was backed up, a storage location of the backed-up client data, an object ID to which the backed up client data is stored, and various other types of information. Accordingly, the metadata database 160, and more particularly, the metadata stored therein, may be leveraged by the server 120 when storing data in an efficient manner. For example, when backing up data (e.g. as part of an incremental backup), data written to the object storage 150 may include only changes to the metadata associated with the client data. In such circumstances, the server 120 may store such changes exclusively within the metadata database 160. In other words, certain changes to client data may be stored only within the metadata database 160 and not within objects of the object storage 150. This results in a conservation of storage resources as new data objects may not be required when writing (or storing) data on the object storage 150.

In addition, the server 120 (e.g. via the data manager 175) may also manage scheduling of data operations. To perform such scheduling, the server 120 may manage (or maintain) an operation pool (or queue, list, set, etc.) 185. The operation pool 185 may store one or more queues for performing data operations on the object storage 150 (e.g. as further described herein with reference to FIG. 3).

Figure 2:
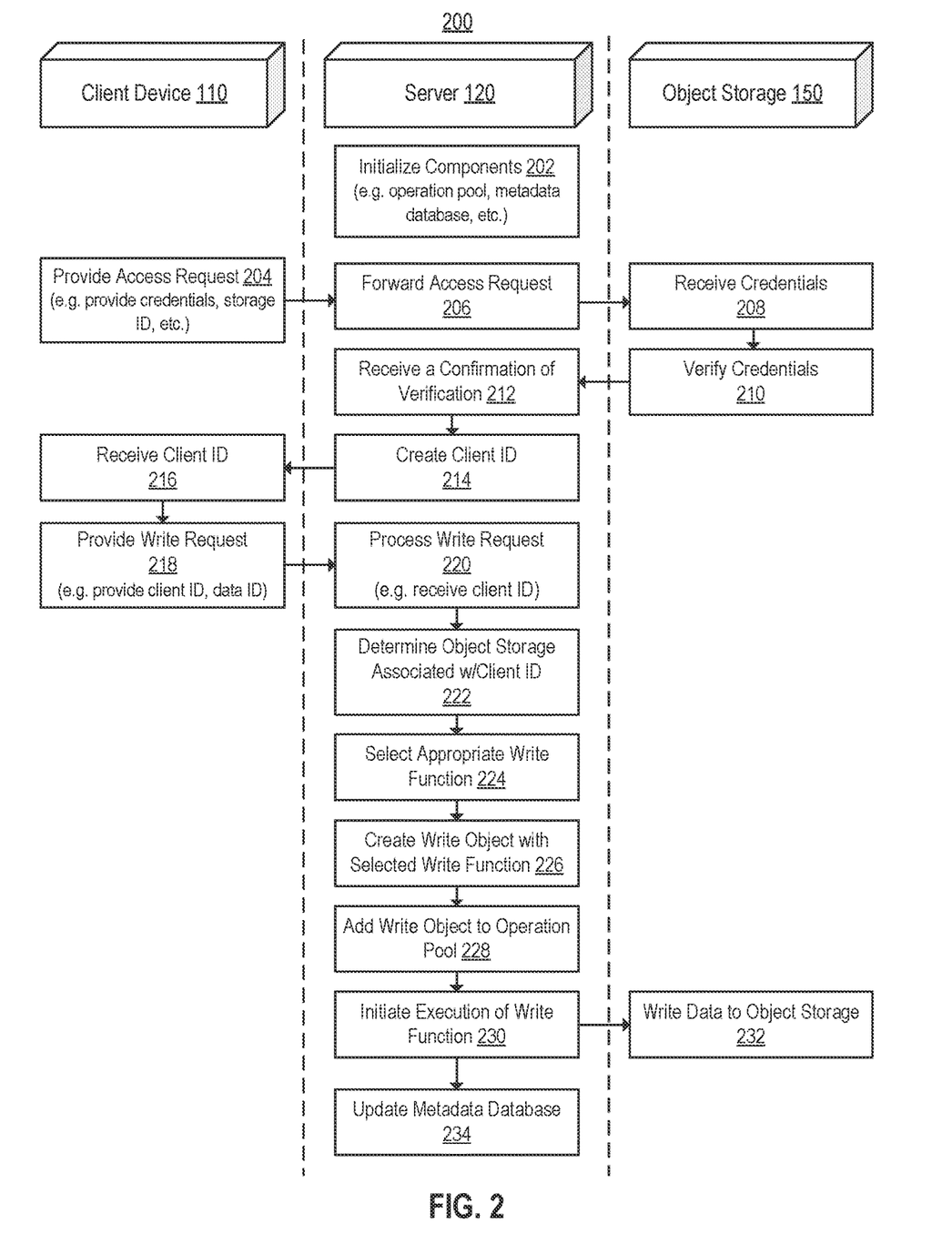
FIG. 2 is a block diagram illustrating an interaction between components when storing data to an object storage according to one or more embodiments of the disclosure.

FIG. 2 is a block diagram illustrating an interaction between components when storing data to an object storage according to one or more embodiments of the disclosure.

As shown, diagram 200 shows an example interaction between a client device 110, server 120, and an object storage 150. As shown, in 202, the server (e.g. via the data manager 175) may initialize a set of components that are used by the server 120 to provide an object-storage-agnostic interface for managing backup data for an object storage 150. The set of components may include one or more of an operation pool (e.g. operation pool 185), interface components (e.g. server API 125), and a metadata database (e.g. metadata database 160). In some embodiments, an instance of each component may be created for each client, data operation, object storage 150 (e.g. object storage provider), or a combination thereof. For example, a first operation pool may be created for a particular (or specific) object storage (e.g. object storage A 150A), and a second operation pool may be created for a different object storage (e.g. object storage B 150B). In some embodiments, a particular object storage (e.g. object storage 150A/150B) may correspond to a particular object storage provider. As another example, a first metadata database may be created for a particular (or specific) client device (e.g. client device A 110A), and a second metadata database may be created for a different client device (e.g. client device B 110B).

In 204, the client device 110 may provide, to the server 120, an access request requesting access to the object storage

150. In some embodiments, the access request may include an identifier for a particular object storage (e.g. object storage ID), one or more credentials that are required to access the particular object storage, and any other information that may be required, or provided optionally, when accessing (or connecting to) the object storage 150. The credentials may be associated with the client device 110 and/or a user associated with the client device 110. For example, the credentials may include an access key and/or a secret key. In addition, the access request may include additional information such as a region identifier indicating a particular instance of the object storage 150 to which access is requested.

Upon receiving the access request, the server 120 may process the access request, and in 206, forward (or provide) the access request to the object storage 150. Accordingly, in 208, the object storage 150 may receive the credentials of the client device 110. In 210, the object storage 150 may verify the credentials, and thus, allow the client device 110 to access the object storage 150. In 212, the server 120 may receive a confirmation of verification indicating that the client device 110 is authorized to access the object storage 150. In response to such a confirmation, in 214, the server 120 may create a client identifier (ID) for the client device 110. The client ID may be used by the server 120 to route subsequent data operation requests received by the server 120 to the appropriate object storage 150 (or instance thereof). For example, the server 120 may maintain a client ID database associating the client IDs with particular object storages 150 (or instances thereof) to which access has been granted. In 216, the client device 110 may receive the client ID from the server 120. For example, the client ID may be returned to the client device 110 in response to the initial access request when the credentials have been verified. Once the client device 110 provides the appropriate credentials, the server 120 may now process data operation requests from the client device 110. For instance, as shown in this example, in 218, the client device 110 may provide a write request to write (e.g. store) client data (or data) to the object storage 150. For example, the write request may be provided by calling a write method (or operation, function, etc.) of an API provided by the server (e.g. server API 125). In some embodiments, the write method may include information (e.g. data ID) identifying the data to be written to the object storage 150, a storage destination, the client ID, and any other information that may be provided when writing data to the object storage 150. Accordingly, in 220, the server 120 may process the write request. This process may include determining the particular object storage 150 (or instance thereof) associated with the client device 110 provided with the write request. For example, in 222, the server 120 may determine the particular (or destination) object storage 150 associated with the provided client ID aby performing a lookup (e.g. a search of the client ID database). In response to identifying the object storage 150 based on the client ID, the server in 224, may select (or identify) the appropriate write function (or method, operation, call, etc.) associated with the object storage 150. For example, the write function may be selected from amongst a set of write functions stored in a function library (e.g. function library 130). As described, the selected write function may use, or be part of, a storage API (e.g. storage API 155) provided by the particular object storage 150. For example, the write function may include (or call) a put method (or operation, function, etc.) of the storage API that writes data to the object storage 150.

As part of managing data operations on the object storage 150, the server 120 may schedule operations using an instantiated operation pool (e.g. an operation pool instantiated in 202). Accordingly, the server 120 may create a write object corresponding to the received write request. In particular, in 226, the server 120 may create the write object that includes (or references, uses, calls, etc.) the selected write function (e.g. write function selected in operation 224). In 228, the server 120 may then add (or enqueue) the write object to an appropriate queue within the operation pool. For example, the operation pool may include a queue for each type of data operation, and thus, the write object may be added to the write operation queue. In 230, once the ordering of the queue reaches the write object, the server 120 may initiate execution of the write function to write the data to the object storage 150. As a result, in 232, the object storage 150 may write the data to one or more objects in response to receiving the write instruction. It should be noted, the server 120 may perform the write operation in a synchronous or asynchronous manner. In addition, in response to receiving the write request, in 234, the server 120 may also correspondingly update the metadata database (e.g. metadata database instantiated in 202). For example, the server 120 may update the metadata database to include information associated with the data written to the object storage 150 that may be leveraged to perform an efficient recovery procedure.

As described, the server 120 may use an operation pool when managing data operations. An example of such an operation pool is further described with reference to FIG. 3.

Figure 3:
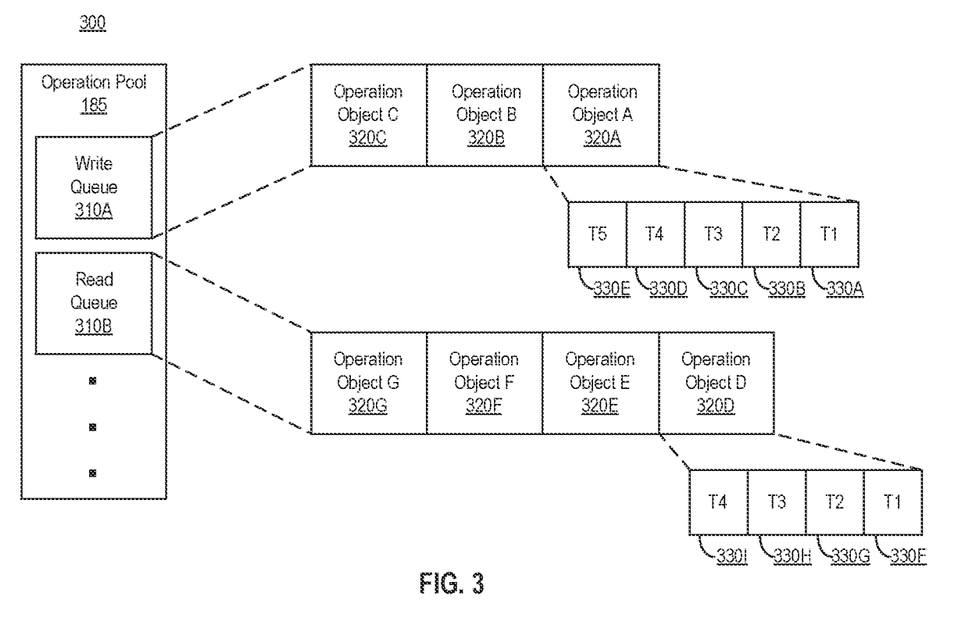
FIG. 3 is a block diagram illustrating an example configuration for an operation pool according to one or more embodiments of the disclosure.

FIG. 3 is a block diagram 300 illustrating an example configuration for an operation pool 185 according to one or more embodiments of the disclosure.

As shown, to provide efficient management of access requests to an object storage (e.g. object storage 150), a server (e.g. server 120) may manage (or maintain) an operation pool 185 to schedule (or distribute) such access requests to the object storage. For example, these access requests may be data operations (e.g. write requests) that are initiated via API calls to object storage (e.g. via calls to storage API 155). In some embodiments, the operation pool 185 may be configured to allow the server to perform data operations (or operations) on the object storage in a thread-safe manner. Accordingly, the operation pool 185 may ensure thread-safety while providing an efficient allocation of resources. For example, data operations may be managed such that operations are accurately fulfilled (e.g. according to their design specifications) and without unintended interaction.

As shown, the operation pool 185 may store an operation queue 310 for each type of data operation that may be performed on the object storage. In other words, in some embodiments, an operation queue 310 may be an operation-specific (or operation-type-specific) queue. For example, these data operations may include read, write, delete, bulk delete, copy (e.g. storage-side copy), and other types of data operations that may be used to access, manipulate, or manage data stored on the object storage. In some embodiments, the type of data operations may include (or correspond to) the available types of access requests to the object storage. For example, the types of data operations may correspond to the available types of methods (or calls, functions, operations, etc.) provided by a storage API. As shown in this example, the data operations provided by the object storage may include at least a write operation and a read operation. Accordingly, as shown, the access request pool 185 may include a write operation queue 310A representing write operations to be performed on the object storage, and a read operation queue 310B representing read operations to be performed on the object storage.

As shown, each operation queue 310 may store a set of operation objects (or elements, identifiers, etc.) 320. Each operation object 320 may represent (or identify, reference, etc.) an operation to be performed on the object storage. For example, a server may receive a request to perform a data operation on the object storage from a client device (e.g. client device 110), the server may then store a representation of the requested data operation as an operation object 320. As shown in this example, write queue 310A may store three operation objects (e.g. operation objects 320A-C) that represent three different write requests, and read queue 310B may store four operation objects (e.g. operation objects 320D-G) that represent four different read requests. It should be noted that the operation queue (or operation-based queue) 310 may be configured in any suitable manner using one or more suitable types of data structures (e.g. an array of objects), and although an object is used to represent operations (e.g. operation objects 320), any suitable type of data structure may be used.

To improve operation performance, requested data operations such as large read and write operation may be divided (or partitioned, separated, etc.) into smaller operations. These smaller operations may be performed as part of a process, and accordingly, may be divided into sub-operations (or threads) 330. Accordingly, each operation object 320 may identify (or reference, represent, etc.) a set sub-operations 330 to be performed that complete a corresponding data operation (or parent data operation). As shown in this example, operation object 320A represents a write operation to be performed on the object storage, and operation object 320D represents a read operation to be performed on the object storage. Accordingly, the write operation represented by operation object 220A may include five sub-operations (e.g. threads 1-5) 330A-E, and the read operation represented by operation object 320D may include four sub-operations (e.g. threads 1-4) 330F-I.

To further improve operation performance, one or more sub-operations 330 may be initiated (or executing, run, etc.) concurrently (or simultaneously, at the same time, etc.). An object storage may have a limit on the number of operation (or access) requests it may be able to handle at any given point in time. As a result, the operation pool 185 may be referenced to determine an ordering (e.g. schedule) for the sub-operations 330. For example, if the server divides a write operation into 5 sub-operations (e.g. sub-operations 330A-E), and the object storage can currently handle an additional 4 concurrent operation requests, the server may initiate only 4 of the sub-operations (e.g. sub-operations 330A-D) to be performed concurrently. As a result, the remaining sub-operations (e.g. sub-operation 330E) may be initiated upon the availability of an operation request to the object storage. In addition, the various types of sub-operations may execute concurrently. For example, the four write sub-operations 330A-D may execute concurrently with the four read operations 330F-I. Accordingly, upon freeing of an operation request from a completion of any of sub-operations 330A-D or 330F-I, the server may initiate the execution of sub-operation 230E.

In some embodiments, a limit of concurrent operation requests may be limited based on settings specified during the initialization of the operation pool 185. For example, the server may receive one or more configuration settings from the client device specifying settings associated with the operation pool 185. These settings such as concurrent operation request limits may apply to operation types. For example, the limit may be determined based on the sum of all the currently executing write, read, delete, etc. operations. In some embodiments, the limit of concurrent operation requests may apply to a particular type of operation (e.g. an operation-specific/operation-type-specific limit). For example, the limit for concurrent write requests may be determined based on the current number of executing write operations. Similarly, the limit for concurrent read requests may be determined based on the current number of executing read operations. Accordingly, the execution performance of various data operation requests may be improved by scheduling corresponding sub-operations 230 according to the specialized operation pool 185.

Figure 4:
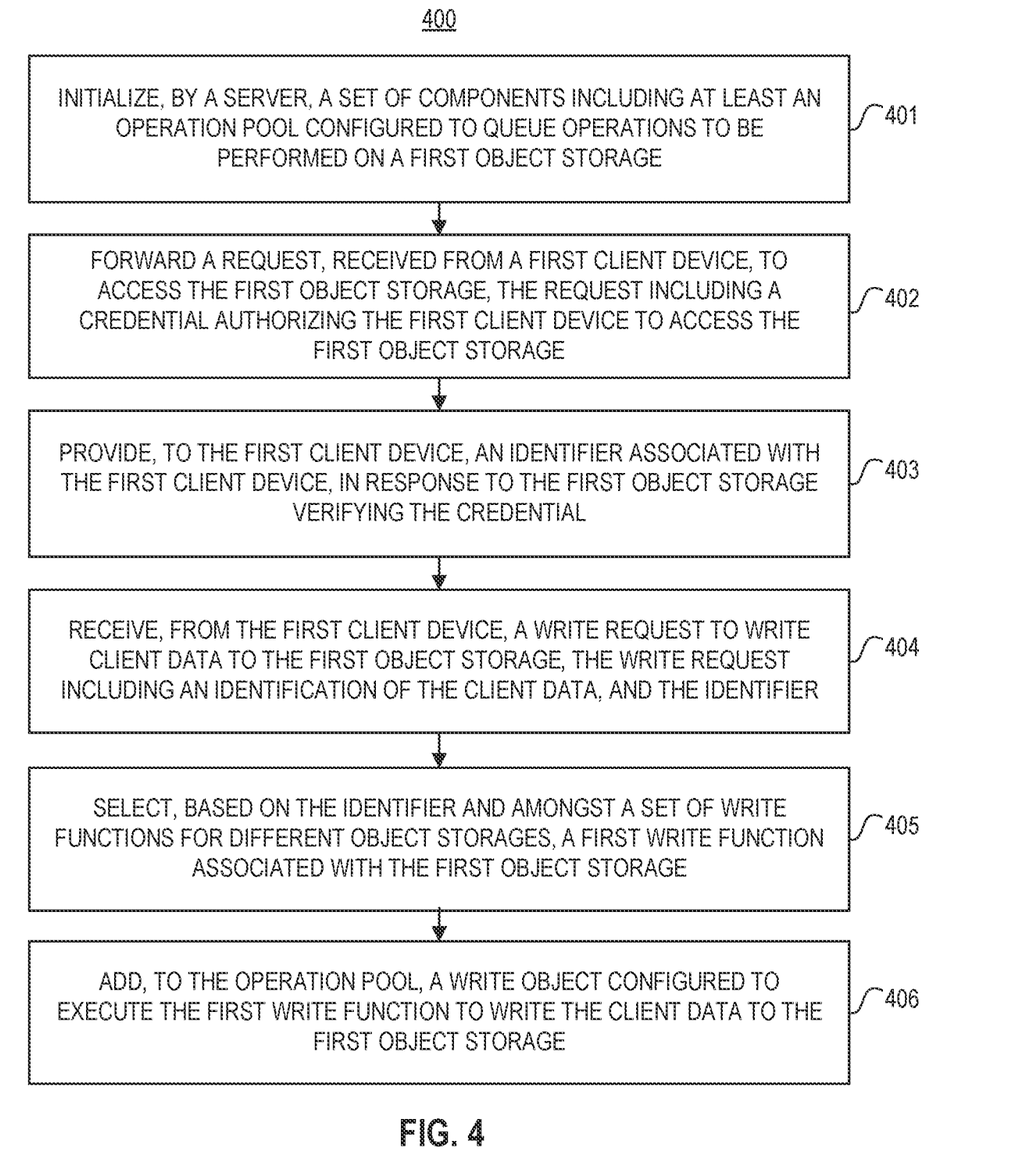
FIG. 4 is a flow diagram illustrating an example method of storing data to an object storage according to one or more embodiments of the disclosure.

FIG. 4 is a flow diagram illustrating an example method of storing (e.g. writing) data to an object storage according to one or more embodiments of the disclosure. Process 400 may use processing logic, which may include software, hardware, or a combination thereof. For example, process 400 may be performed by a system including one or more components described in operating environment 100 (e.g. server 120, data manager 175, etc.).

In 401, the system (e.g. server 120) may initialize a set of components. In some embodiments, the initialization may be performed by the server acting as an intermediary between one or more cloud-based object storages (e.g. object storages 150A and 150B) and one or more client devices (e.g. client devices 110A and 110B). The set of components may include at least an operation pool (e.g. operation pool 185) configured to queue operations to be performed on a first cloud-based object storage (e.g. object storage A 150A). The operation pool may be initialized based on one or more configuration settings received from a first client device (e.g. client device A 110A). For example, the first client device may provide a number of concurrent operation requests (or data access requests) to be used when writing data to the object storage. As another example, the first client device may provide a number (or limit) of retry attempts when connecting to the first object storage when performing a data operation. In some embodiments, the set of components may also include a metadata database (e.g. metadata database 160) configured to store metadata associated with the client data. For example, the system may initialize a metadata database for the first client device.

In 402, the system may forward a request, received from a first client device (e.g. client device A 110A), to access the first object storage (e.g. object storage A 150A). The request may include a credential authorizing the first client device to access the first object storage.

In 403, the system may provide, to the first client device, an identifier (e.g. client ID) associated with the first client device, in response to the first object storage verifying the credential.

As described, after performing an access verification, the system may receive, from the first client device, a request to perform a data operation (e.g. read, write, copy, etc.) on the object storage.

More particularly, in 404, the system may receive, from the first client device, a write request to write client data to the first object storage. The write request may include an identification of the client data, and the identifier (e.g. client ID). In some embodiments, the write request may be received via an application programming interface (API) associated with the server (e.g. server API 125). In some embodiments, the API associated with the server may be used by all the client devices.

In some embodiments, the system may also determine the write request includes changes to the metadata associated with the client data. Accordingly, the system may update the metadata database to store the changed metadata, in response to receiving the write request.

In 405, the system may select, based on the identifier and amongst a set of write functions for different object storages, a first write function associated with the first object storage. For example, the first write function may be selected from amongst a set of functions stored in a function library (e.g. function library). In other words, the first write function may be an object-storage-specific associated with the first object storage. In some embodiments, the first write function may be configured to use an API associated with the first object storage (e.g. storage API 155A) to write the client data to the first object storage.

In 406, the system may add a write object (e.g. object A 320A) to the operation pool. The write object may be configured to execute the first write function to write the client data to the first object storage. In some embodiments, adding the write object to the operation pool may include adding the write object to a write operation queue (e.g. write queue 310A) of the operation pool. In some embodiments, the write object may be further configured to execute the write function as a set of sub-operations (e.g. sub-operations 330A-E). As described, the operation pool may be initialized based on one or more configuration settings received from the first client device. In some embodiments, the one or more configuration settings may include a number of write sub-operations that may be performed concurrently on the first object storage Accordingly, the method may allow clients to seamlessly interact with different object storages.

Figure 5:
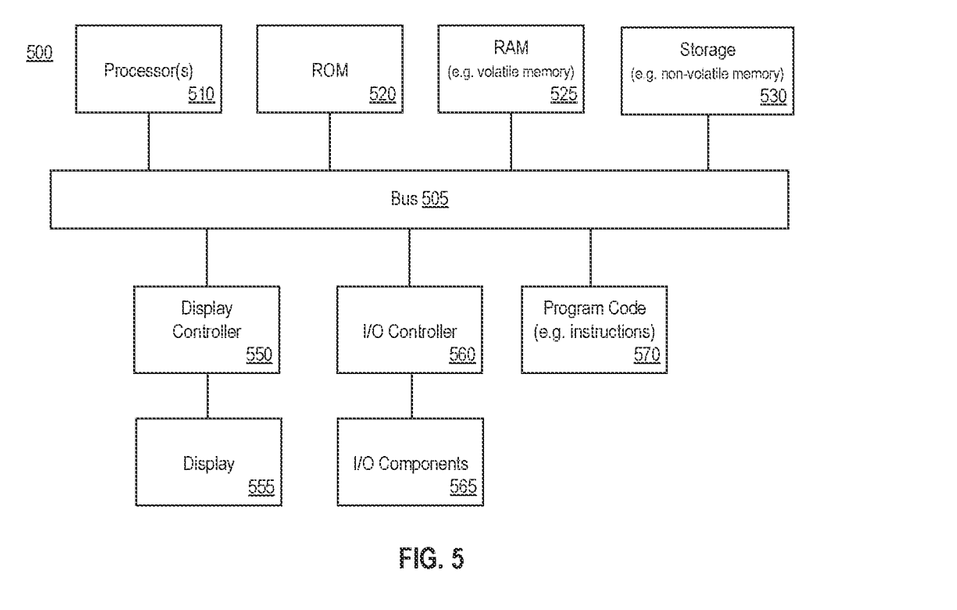
FIG. 5 is a block diagram illustrating an example of a computing system that may be used in conjunction with one or more embodiments of the disclosure.

FIG. 5 shows a block diagram of an example of a computing system that may be used in conjunction with one or more embodiments of the disclosure. For example, computing system 500 (or system, or server, or computing device, or device) may represent any of the devices or systems (e.g. server 120, client device 110, object storage 150, etc.) described herein that perform any of the processes, operations, or methods of the disclosure. Note that while the computing system 500 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 500 may include a bus 505 which may be coupled to a processor 510, ROM (Read Only Memory) 520, RAM (or volatile memory) 525, and storage (or non-volatile memory) 530. The processor(s) 510 may retrieve stored instructions from one or more of the memories 520, 525, and 530 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 510 may perform operations in an on-demand or "cloud computing" environment or as a service (e.g. within a "software as a service" (SaaS) implementation). Accordingly, the performance of operations may be distributed among the one or more processors 510, whether residing only within a single machine or deployed across a number of machines. For example, the one or more processors 510 may be located in a single geographic location (e.g. within a home environment, an office environment, or a server farm), or may be distributed across a number of geographic locations. The RAM 525 may be implemented as, for example, dynamic RAM (DRAM), or other types of memory that require power continually in order to refresh or maintain the data in the memory. Storage 530 may include, for example, magnetic, semiconductor, tape, optical, removable, non-removable, and other types of storage that maintain data even after power is removed from the system. It should be appreciated that storage 530 may be remote from the system (e.g. accessible via a network).

A display controller 550 may be coupled to the bus 505 in order to receive display data to be displayed on a display device 555, which can display any one of the user interface features or embodiments described herein and may be a local or a remote display device. The computing system 500 may also include one or more input/output (I/O) components 565 including mice, keyboards, touch screen, network interfaces, printers, speakers, and other devices. Typically, the input/output components 565 are coupled to the system through an input/output controller 560.

Program code 570 may represent any of the instructions, applications, software, libraries, toolkits, modules, components, engines, units, functions, logic, etc. as described herein (e.g. server 120, data manager 175, etc.). Program code 570 may reside, completely or at least partially, within the memories described herein (e.g. non-transitory computer-readable media), or within a processor during execution thereof by the computing system. Program code 570 may include both machine code, such as produced by a compiler, and files containing higher-level or intermediate code that may be executed by a computing system or other data processing apparatus (or machine) using an interpreter. In addition, program code 570 can be implemented as software, firmware, or functional circuitry within the computing system, or as combinations thereof. Program code 570 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer-readable medium storing a plurality of instructions, which when executed, cause the one or more processors to:
   initialize, by a server, a set of components including at least an operation pool configured to queue operations to be performed on a first type of object storage or a second type of object storage that are cloud-based;
   forward a request, received from a first client device, to access the first type of object storage, the request including a credential authorizing the first client device to access the first type of object storage;
   provide, to the first client device, an identifier associated with the first client device, in response to the first type of object storage verifying the credential;
   receive, from the first client device, a write request to write client data to the first type of object storage, the write request including an identification of the client data, and the identifier;
   select, based on the identifier and amongst a set of a first write function that is specific to the first type of object storage or a second write function that is specific to the second type of object storage, the first write function that is specific to the first type of object storage; and
   add a write object to the operation pool, the write object configured to execute the first write function to write client data that is specific to the first type of object storage.

2. The system of claim 1, wherein the write request to write client data to the first type of object storage is received via an application programming interface (API) associated with the server.

3. The system of claim 1, wherein the first write function is configured to use an API associated with the first type of object storage to write the client data to the first type of object storage.

4. The system of claim 1, wherein adding the write object to the operation pool includes adding the write object to a write operation queue of the operation pool, the write object further configured to execute the write function as a set of sub-operations.

5. The system of claim 4, wherein the operation pool is initialized based on one or more configuration settings received from the first client device.

6. The system of claim 5, wherein the one or more configuration settings include a number of write sub-operations that may be performed concurrently on the first type of object storage.

7. The system of claim 1, wherein the set of components further includes a metadata database configured to store metadata associated with the client data.

8. The system of claim 7, wherein the plurality of instructions, when executed, further cause the one or more processors to:
   determine the write request includes changes to the metadata associated with the client data; and
   update the metadata database to store the changed metadata, in response to receiving the write request.

9. A method comprising:
   initializing, by a server, a set of components including at least an operation pool configured to queue operations to be performed on a first type of object storage or a second type of object storage that are cloud-based;
   forwarding a request, received from a first client device, to access the first type of object storage, the request including a credential authorizing the first client device to access the first type of object storage;
   providing, to the first client device, an identifier associated with the first client device, in response to the first type of object storage verifying the credential;
   receiving, from the first client device, a write request to write client data to the first type of object storage, the write request including an identification of the client data, and the identifier;
   selecting, based on the identifier and amongst a set of a first write function that is specific to the first type of object storage or a second write function that is specific to the second type of object storage, the first write function that is specific to the first type of object storage; and
   adding a write object to the operation pool, the write object configured to execute the first write function to write the client data that is specific to the first type of object storage.

10. The method of claim 9, wherein the write request to write client data to the first type of object storage is received via an application programming interface (API) associated with the server.

11. The method of claim 9, wherein the first write function is configured to use an API associated with the first type of object storage to write the client data to the first type of object storage.

12. The method of claim 9, wherein adding the write object to the operation pool includes adding the write object to a write operation queue of the operation pool, the write object further configured to execute the write function as a set of sub-operations.

13. The method of claim 9, wherein the set of components further includes a metadata database configured to store metadata associated with the client data.

14. The method of claim 13, further comprising:
   determining the write request includes changes to the metadata associated with the client data; and
   updating the metadata database to store the changed metadata, in response to receiving the write request.

15. A computer program product comprising a non-transitory computer-readable medium having a computer-readable program code embodied therein to be executed by one or more processors, the program code including instructions to:

initialize, by a server, a set of components including at least an operation pool configured to queue operations to be performed on a first type of object storage or a second type of object storage that are cloud-based;

forward a request, received from a first client device, to access the first type of object storage, the request including a credential authorizing the first client device to access the first type of object storage;

provide, to the first client device, an identifier associated with the first client device, in response to the first type of object storage verifying the credential;

receive, from the first client device, a write request to write client data to the first type of object storage, the write request including an identification of the client data, and the identifier;

select, based on the identifier and amongst a set of a first write function that is specific to a first type of object storage or a second write function that is specific to a second type of object storage, the first write function that is specific to the first type of object storage; and add a write object to the operation pool, the write object configured to execute the first write function to write the client data that is specific to the first type of object storage.

16. The computer program product of claim 15, wherein the write request to write client data to the first type of object storage is received via an application programming interface (API) associated with the server.

17. The computer program product of claim 15, wherein the first write function is configured to use an API associated with the first type of object storage to write the client data to the first type of object storage.

18. The computer program product of claim 15, wherein adding the write object to the operation pool includes adding the write object to a write operation queue of the operation pool, the write object further configured to execute the write function as a set of sub-operations.

19. The computer program product of claim 15, wherein the set of components further includes a metadata database configured to store metadata associated with the client data.

20. The computer program product of claim 19, wherein the program code includes further instructions to:
   determine the write request includes changes to the metadata associated with the client data; and
   update the metadata database to store the changed metadata, in response to receiving the write request.

* * * * *